US012188298B2

(12) United States Patent
Mitchell

(10) Patent No.: US 12,188,298 B2
(45) Date of Patent: Jan. 7, 2025

(54) WATER RESISTIVE ENTRANCE DOORS FOR BUILDINGS

(71) Applicant: ARCONIC TECHNOLOGIES LLC, Pittsburgh, PA (US)

(72) Inventor: Michael David Mitchell, Norcross, GA (US)

(73) Assignee: ARCONIC TECHNOLOGIES LLC, Pittsburgh, PA (US)

( * ) Notice: Subject to any disclaimer, the term of this patent is extended or adjusted under 35 U.S.C. 154(b) by 0 days.

(21) Appl. No.: 18/254,140

(22) PCT Filed: Nov. 12, 2021

(86) PCT No.: PCT/US2021/059112
§ 371 (c)(1),
(2) Date: May 23, 2023

(87) PCT Pub. No.: WO2022/125266
PCT Pub. Date: Jun. 16, 2022

(65) Prior Publication Data

US 2024/0026732 A1 Jan. 25, 2024

Related U.S. Application Data

(60) Provisional application No. 63/123,156, filed on Dec. 9, 2020.

(51) Int. Cl.
*E06B 7/26* (2006.01)
*E06B 7/23* (2006.01)

(52) U.S. Cl.
CPC .............. *E06B 7/26* (2013.01); *E06B 7/2312* (2013.01)

(58) Field of Classification Search
CPC ........ E06B 7/26; E06B 7/2312; E06B 7/2316; E06B 7/2307; E06B 1/70; E06D 2009/007
See application file for complete search history.

(56) References Cited

U.S. PATENT DOCUMENTS 3,834,081 A * 9/1974 Catlett .................. E05F 15/643 49/327
4,686,793 A 8/1987 Mills
5,010,690 A * 4/1991 Geoffrey ................... E06B 1/70 49/468

(Continued)

FOREIGN PATENT DOCUMENTS

KR 102138878 B1 7/2020

OTHER PUBLICATIONS

Written Opinion and International Search Report from corresponding PCT Application No. PCT/US2021/059112 mailed Mar. 4, 2023.

*Primary Examiner* — Marcus Menezes
(74) *Attorney, Agent, or Firm* — Vorys, Sater, Seymour and Pease LLP

(57) ABSTRACT

A door system includes a doorframe having opposing vertical jambs, a door pivotably coupled to the doorframe, a threshold extending between the opposing vertical jambs and providing an upper surface that defines a valley, and a dam removably mountable to the threshold at the valley. A valley seal interposes the dam and the threshold at the valley when the dam is mounted to the threshold and thereby generates a sealed interface between the dam and the threshold.

17 Claims, 7 Drawing Sheets

(56) References Cited

U.S. PATENT DOCUMENTS

| | | | | |
|---|---|---|---|---|
| 5,179,804 | A * | 1/1993 | Young | E06B 1/70 49/470 |
| 5,816,309 | A * | 10/1998 | Paradise | E05B 65/0085 160/40 |
| 9,816,311 | B2 * | 11/2017 | Reyes | E06B 1/70 |
| 11,174,673 | B2 * | 11/2021 | Nana | E06B 1/70 |
| 2006/0064937 | A1 * | 3/2006 | Danczek | E06B 7/22 49/475.1 |
| 2013/0305610 | A1 * | 11/2013 | Meeks | E06B 7/2316 49/471 |
| 2016/0029616 | A1 * | 2/2016 | Johnston | E06B 7/2309 43/132.1 |
| 2017/0016268 | A1 | 1/2017 | Reyes | |
| 2018/0266168 | A1 * | 9/2018 | Jetton | E06B 1/70 |
| 2019/0352958 | A1 * | 11/2019 | Albrecht | E06B 1/36 |
| 2020/0355020 | A1 * | 11/2020 | Clark | E06B 3/7015 |

* cited by examiner

WATER RESISTIVE ENTRANCE DOORS FOR BUILDINGS

BACKGROUND

Residential and commercial buildings are often adversely affected by high winds and flooding, as is common with hurricanes and other severe weather conditions. Entrance doors to residential and commercial buildings are particularly susceptible to the ingress of air and water during severe weather conditions. Damage caused by such weather events have heightened a need for temporary control barriers that may be quickly erected at a desired site and then disassembled when the need for wind and flood protection is abated.

Accordingly, assemblies and systems that help reduce or prevent the ingress of air and water through entrance doors of residential and commercial buildings during severe weather conditions, or at any time, is desirable.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

Embodiments disclosed herein include a door system that includes a doorframe having opposing vertical jambs, a door pivotably coupled to the doorframe, a threshold extending between the opposing vertical jambs and providing an upper surface that defines a valley, a dam removably mountable to the threshold at the valley, and a valley seal interposing the dam and the threshold at the valley when the dam is mounted to the threshold and thereby generating a sealed interface between the dam and the threshold. In a further embodiment, the dam provides a projection extending downward from a bottom of the dam and sized to be received within the valley. In another further embodiment, the door system includes a cover that occludes the valley and is removable prior to mounting the dam at the valley. In another further embodiment, the dam defines a cover recess sized to receive and removably secure the cover once removed from the threshold. In another further embodiment, the door system further includes a door sweep assembly mounted to a backside of the door, and a sweep recess defined on the dam and sized to receive at least a portion of the door sweep assembly when the door is closed. In another further embodiment, the door system includes a face seal interposing a backside of the door and the dam and generating a sealed interface between the door and the dam when the door is closed. In another further embodiment, the door system includes one or more mechanical fasteners that secure the dam to the threshold. In another further embodiment, the one or more mechanical fasteners extend vertically through the dam and are received by a corresponding one or more threaded apertures defined in the valley. In another further embodiment, the door system includes an end cap coupled to one or both ends of the dam. In another further embodiment, the doorframe includes a header that provides an elongate storage compartment sized to receive and store the dam when not in use. In another further embodiment, the door comprises a first door and the door system further comprises a second door pivotably coupled to the doorframe, wherein an elongated clearance gap is generated between the first and second doors when the first and second doors are closed, and a seal assembly installed in the clearance gap and including first and second side seals coupled to a center stile of the first door, and a center seal coupled to a center stile of the second door and interposing the first and second side seals when the first and second doors are closed. In another further embodiment, the door system includes an applied cover attached to one of the first or second doors and extending across and occluding the clearance gap.

Embodiments disclosed herein may further include a removable dam assembly that includes an elongate dam defining a projection extending downward from a bottom of the dam, a threshold extendable between opposing vertical jambs of a doorframe and providing an upper surface that defines a valley sized to receive the projection, and a valley seal attached to the bottom of the dam and interposing the dam and the threshold at the valley when the dam is mounted to the threshold, whereby the valley seal generates a sealed interface between the dam and the threshold. In a further embodiment, the dam assembly includes a cover that occludes the valley and is removable prior to mounting the dam at the valley. In another further embodiment, the cover is removably coupled to the threshold at the valley using one or more mechanical fasteners. In another further embodiment, the dam defines a cover recess sized to receive and removably secure the cover once removed from the threshold. In another further embodiment, the dam includes a seal recess defined on a front surface of the dam, and a face seal attached to the front surface of the dam at the seal recess. In another further embodiment, the dam includes one or more mechanical fasteners that extend vertically through the dam and are received by a corresponding one or more threaded apertures defined in the valley to secure the dam to the threshold. In another further embodiment, the one or more mechanical fasteners provide a manually actuatable head that allows a user to manually advance and secure the one or more mechanical fasteners. In another further embodiment, the dam includes an end cap coupled to one or both ends of the dam.

Embodiments disclosed herein may further include a seal assembly for a door system including first and second doors pivotably coupled to opposing door jambs of a doorframe, wherein an elongated clearance gap is generated between the first and second doors when the first and second doors are closed, the seal assembly including first and second side seals coupled to a vertical edge of a center stile of the first door, wherein each side seal extends laterally through the clearance gap to engage a center stile of the second door when the first and second doors are closed, and a center seal coupled to a vertical edge of the center stile of the second door and interposing the first and second side seals when the first and second doors are closed, wherein the center seal extends laterally through the clearance gap to engage the center stile of the first door when the first and second doors are closed. In a further embodiment, the first and second side seals extend along an entire height of the center stile of the first door, and wherein the center seal extends along an entire height of the center stile of the second door. In another further embodiment, the vertical edge of one or both of the center stiles is convex. In another further embodiment, one or both of the first and second side seals comprise pile weather stripping received within corresponding reglets defined in the vertical edge of the center stile of the first door. In another further embodiment, the first side seal is arranged near an inner surface of the first door and the second side seal is arranged near an outer surface of the first door. In another further embodiment, one or both of the first and second side seals are angled outward relative to an inner or an outer surface of the first door. In another further embodiment, one or both of the first and second side seals extend partially outside the clearance gap. In another further embodiment, the center seal comprises a spring-loaded, applied astragal. In another further embodiment, the center seal includes one or more flanges that extend laterally to engage the center stile of the first door when the first and second doors are closed. In another further embodiment, the seal system includes an applied cover attached to one of the first or second doors and extending across and occluding the clearance gap.

Embodiments disclosed herein may further include a seal assembly for a door system including first and second doors pivotably coupled to opposing door jambs of a doorframe, wherein an elongated clearance gap is generated between the first and second doors when the first and second doors are closed, the seal assembly including a first side seal coupled to a vertical edge of a center stile of the first door and extending laterally through the clearance gap to engage the center stile of the second door when the first and second doors are closed, a second side seal coupled to a vertical edge of the center stile of the second door and extending laterally through the clearance gap to engage the center stile of the first door when the first and second doors are closed, and a center seal coupled to a vertical edge of the center stile of the second door and interposing the first and second side seals when the first and second doors are closed, wherein the center seal extends laterally through the clearance gap to engage the center stile of the first door when the first and second doors are closed. In a further embodiment, the first and second side seals extend along an entire height of the center stiles of the first and second doors, and wherein the center seal extends along an entire height of the center stile of the second door. In another further embodiment, the vertical edge of one or both of the center stiles is convex. In another further embodiment, one or both of the first and second side seals comprise pile weather stripping received within corresponding reglets defined in the vertical edge of the center stile of the first and second doors, respectively. In another further embodiment, the first side seal is arranged near an inner surface of the first door and the second side seal is arranged near an outer surface of the first door. In another further embodiment, one or both of the first and second side seals are angled outward relative to an inner or an outer surface of the first door. In another further embodiment, one or both of the first and second side seals extend partially outside the clearance gap. In another further embodiment, the center seal comprises a spring-loaded, applied astragal. In another further embodiment, the center seal includes one or more flanges that extend laterally to engage the center stile of the first door when the first and second doors are closed. In another further embodiment, the seal system includes an applied cover attached to one of the first or second doors and extending across and occluding the clearance gap.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to door systems and, more particularly, to a removable dam system that may be mounted to a door threshold to help reduce or prevent the migration of water or air across the threshold.

The use of directional terms such as above, below, upper, lower, upward, downward, left, right, and the like are used in relation to the illustrative embodiments as they are depicted in the figures, the upward direction being toward the top of the corresponding figure and the downward direction being toward the bottom of the corresponding figure. However, it will be understood that these terms are used for convenience and ease of description only and are not intended to limit the disclosure to any particular orientation.

Figure 1:
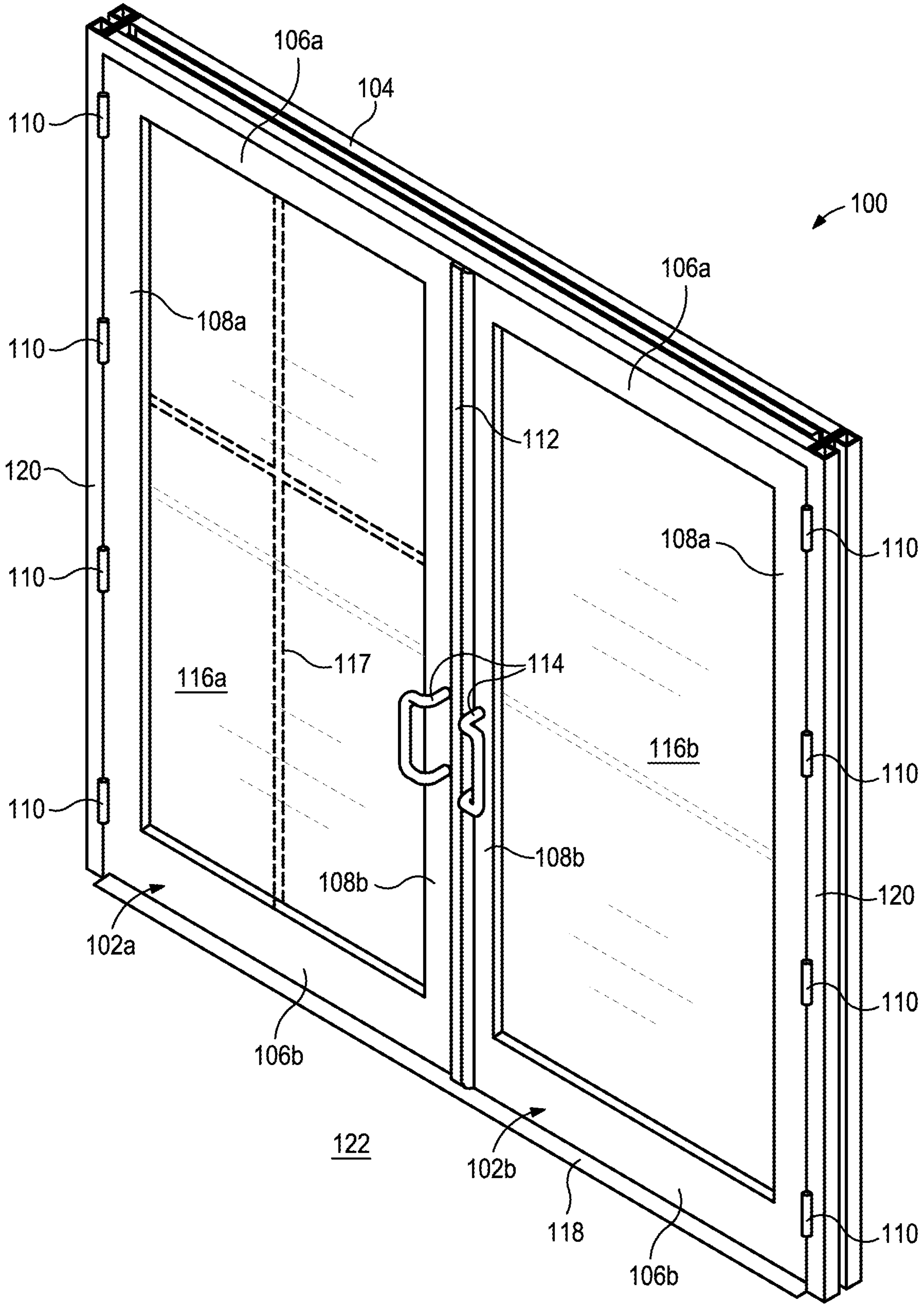
FIG. 1 is an isometric view of an example double-door system that may incorporate one or more principles of the present disclosure.

FIG. 1 is an isometric view of an example door system 100 that may incorporate one or more principles of the present disclosure. The illustrated door system 100 (hereafter "the system 100") comprises a framed building assembly that may form part of a commercial building application. The principles and concepts described herein, however, are equally applicable to residential building applications. Moreover, the principles of the present disclosure may alternatively be applied to other types of framed building assemblies including, but not limited to, window vents, window frames, curtain walls, storefronts, or any combination thereof. Accordingly, while the following discussion is directed to a framed door system, other types of framed assemblies may equally incorporate the presently disclosed features.

As illustrated, the system 100 comprises a double-door assembly that includes a first door 102*a* and a second door 102*b* pivotably mounted to a doorframe 104. While two doors 102*a,b* are included in the system 100, the principles of the present disclosure may be equally applicable to systems that include only one door or more than two doors. The doorframe 104 may be installed in a commercial or residential building (not shown) and define an entryway that is occluded when the doors 102*a,b* close. Each door 102*a,b* may include a plurality of frame members, shown as a top rail 106*a*, a bottom rail 106*b*, and opposing side and center stiles 108*a* and 108*b* that extend between the top and bottom rails 106*a,b*. The ends of each rail 106*a,b* are joined to the adjacent stiles 108*a,b* at generally orthogonal corner joints.

The rails 106*a,b* and the stiles 108*a,b* may comprise hollow, generally rectangular tubes made of a variety of rigid materials including, but not limited to, aluminum, rolled sheet metal, a polymer, a composite material (e.g., fiberglass, carbon fiber, etc.), or any combination thereof. In the illustrated embodiment, the side stiles 108*a* are pivotably mounted to the doorframe 104 on opposite sides with one or more hinges 110. The center stiles 108*b* meet at the middle of the system 100 when the doors 102*a,b* closed and generally define an elongated clearance gap (occluded) between adjacent facing vertical edges (ends) of the center stiles 108*b*. In at least one embodiment, an applied cover 112 may be removably (or permanently) attached to one or both of the center stiles 108*b* on the interior or the exterior of the system 100. The applied cover 112 may be configured to extend across and occlude the clearance gap between the center stiles 108*b*.

In some embodiments, conventional door hardware, such as opposing door handles 114 and locks (not shown) may be installed on one or both of the center stiles 108*b* to help facilitate opening and locking of the doors 102*a,b*.

The rails 106*a,b* and the stiles 108*a,b* cooperatively surround and otherwise "frame" first and second center panels 116*a* and 116*b*, alternately referred to as "infill" panels. While one center panel 116*a,b* is included in each door 102*a,b*, more than one may be employed. In some embodiments, the center panels 116*a,b* may each comprise glass lites and, in at least one embodiment, may comprise double paned glass including air, an inert gas, and/or a plastic film(s) between adjacent panes to control transmission of thermal energy. In other embodiments, however, the center panels 116*a,b* may alternatively comprise other types of infills such as, but not limited to, a glazing panel, polycarbonate, or another clear, translucent, tinted, or opaque panel. Moreover, in other embodiments, one or both of the center panels 116*a,b* may include horizontal and/or vertical grids 117 (shown in dashed lines) that divide the center panels 116*a,b* into multiple panel sections.

The system 100 may further include a threshold 118, also referred to as a "sill". The threshold 118 may extend between the opposing vertical jambs 120 of the doorframe 104 at the bottom. In some embodiments, the threshold 118 may form a bottom part of the doorframe 104. In other embodiments, however, the threshold 118 may comprise a separate component secured to an underlying surface 122. The underlying surface 122 may comprise, for example, a substantially flat and/or horizontal surface, such as a floor or the ground. The underlying surface 122, however, need not be horizontal, but could alternatively be slanted or angled, such as slanted or angled away from the system 100.

The threshold 118 and the elongated clearance gap between the adjacent center stiles 108*b* present vulnerable areas in the system 100 where wind and water may be able to migrate into the interior of the building during severe weather conditions. According to embodiments of the present disclosure, a removable dam may be installed on the backside (e.g., the interior) of the doors 102*a,b* to help reduce or prevent wind and water from migrating into the interior of the building via the threshold 118. Moreover, a seal assembly may be installed at the vertical interface between the center stiles 108*b* to help reduce or prevent wind and water from migrating into the interior of the building via the clearance gap between the center stiles 108*b*.

Figure 2A:
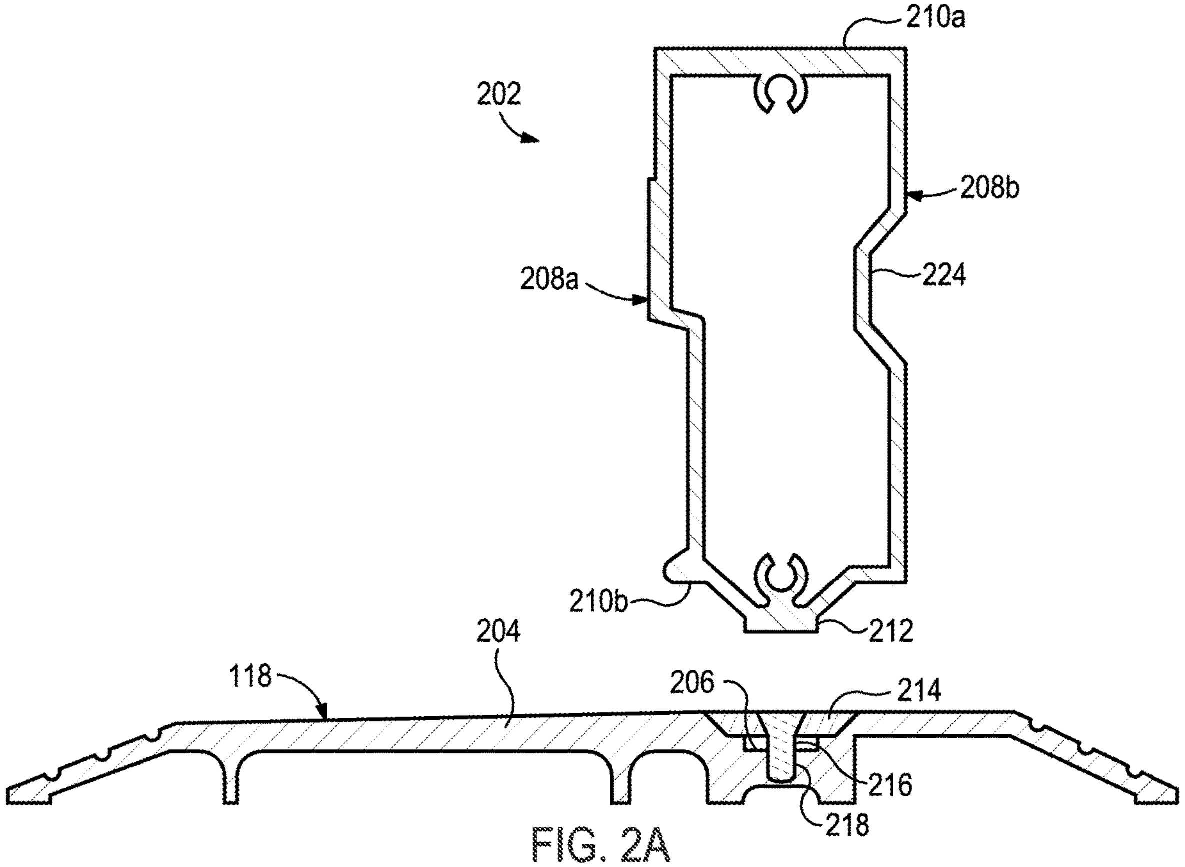
FIGS. 2A and 2B are cross-sectional end views of the threshold of FIG. 1 and an example dam, according to one or more embodiments.
Figure 2B:
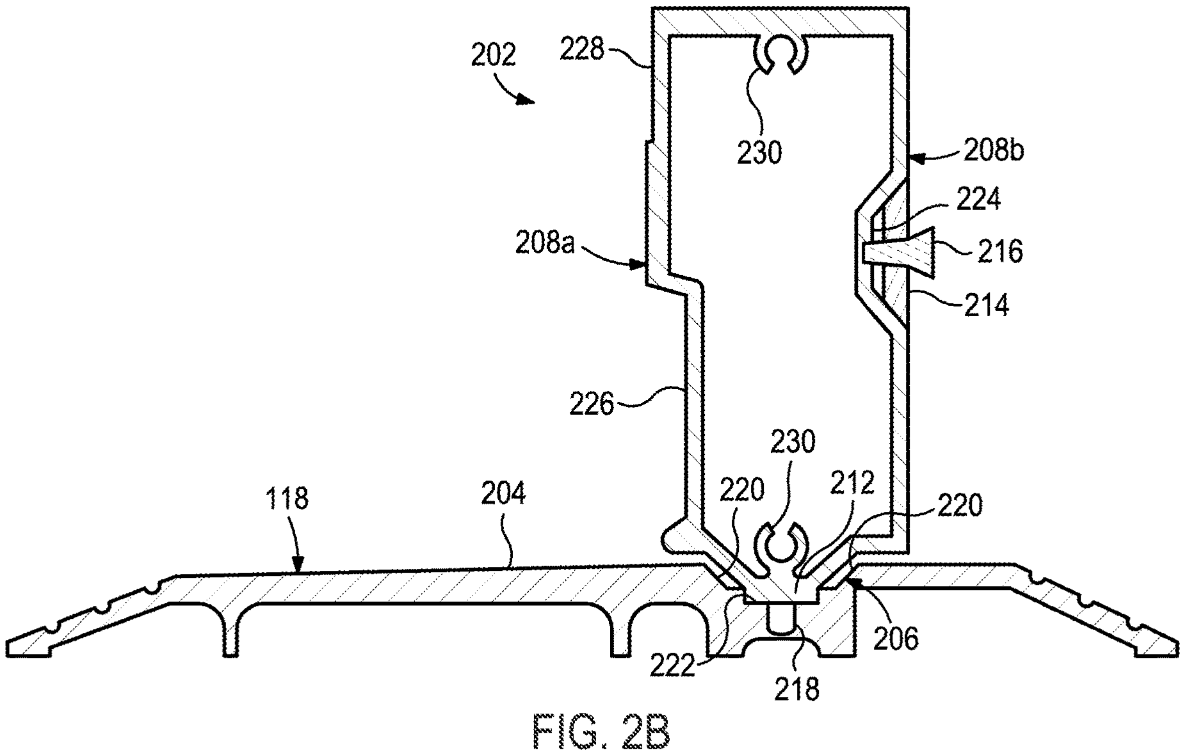

FIGS. 2A and 2B are cross-sectional end views of the threshold 118 and an example removable dam 202, according to one or more embodiments. In FIG. 2A, the dam 202 is shown exploded from the threshold 118, and in FIG. 2B, the dam 202 is shown mounted to the threshold 118. The threshold 118 and the dam 202 may each be made of a rigid material including, but not limited to, aluminum, rolled sheet metal, a polymer, a composite material (e.g., fiberglass, carbon fiber, etc.), or any combination thereof.

Referring first to FIG. 2A, the threshold 118 may provide an upper surface 204, and a valley 206 may be defined in the upper surface 204. The valley 206 may extend along the entire length of the threshold 118. The dam 202 may comprise a generally rectangular and tubular structure that provides a first vertical surface or "front" 208*a*, a second vertical surface or "back" 208*b* opposite the front 208*a*, a top 210*a*, and a bottom 210*b* opposite the top 210*a*. When the dam 202 is properly mounted to the threshold 118, the front 208*a* will be arranged adjacent the backside of the door(s) (e.g., the doors 102*a,b* of FIG. 1), and the back 208*b* will be exposed to the interior of the building.

The dam 202 may provide or otherwise define a vertical projection 212 extending downward from the bottom 210*b* of the dam 202 and sized to be received within the valley 206. The dam 202 may have a length that extends along the entire length of the threshold 118, thus allowing the vertical projection 212 to be received along the entire length of the valley 206. During normal operation, the valley 206 may be occluded with a cover 214 and, therefore, may not be readily visible. When it is determined to install the dam 202, however, the cover 214 may be removed and the dam 202 may be positioned such that the projection 212 is received within the valley 206.

The cover 214 may be removably coupled to the threshold 118 at the valley 206. In some embodiments, for example, the cover 214 may be mechanically fastened to the valley 206, such as with one or more mechanical fasteners 216 (e.g., screws, bolts, etc.). In such embodiments, the mechanical fastener(s) 216 may be configured to align with corresponding apertures 218 defined in the threshold 118 and, more specifically, in the bottom of the valley 206. In other embodiments, however, the cover 214 may be secured to the valley 206 via a snap-fit engagement or an interference fit, without departing from the scope of the disclosure.

FIG. 2B depicts the dam 202 mounted to the threshold 118. More specifically, in FIG. 2B, the vertical projection 212 is received within the valley 206. In some embodiments, the valley 206 may be stepped or otherwise define variable surfaces extending from the upper surface 204 and into the valley 206. More specifically, in some embodiments, the valley 206 may define angled front and back surfaces 220 extending into the valley 206 from the upper surface 204, and a substantially vertical depression or trough 222 may extend from the angled surfaces 220 at the bottom of the valley 206. The angled surfaces 220 may be configured to receive complimentarily angled surfaces of the cover 214 to securely seat the cover 214. In some embodiments, the angled surfaces 220 may allow the cover 214 to be secured at the valley 206 in a flush-fit alignment with the upper surface 204 of the threshold 118. As described in more detail below, the angled surfaces 220 may also provide a location for one or more seals (not shown) configured to seal the interface between the dam 202 and the threshold 118 at the valley 206.

In some embodiments, a cover recess 224 may be defined on the back 208*b* of the dam 202 and may be sized to receive and removably secure the cover 214 after removing the cover 214 from the valley 206. In some embodiments, as illustrated, the cover 214 may be mechanically fastened to the dam 202 at the cover recess 224, such as with the mechanical fastener(s) 216. In other embodiments, however, the cover 214 may alternatively be secured to the dam 202 at the cover recess 224 via a snap-fit engagement or an interference fit.

In some embodiments, a sweep recess 226 may be defined on the front 208*a* of the dam 202 and may be sized to accommodate a door sweep assembly (not shown) coupled to the backside of a door (e.g., the doors 102*a,b* of FIG. 1). In some embodiments, a seal recess 228 may also be defined on the front 208*a* of the dam 202 and may be sized to receive a seal (not shown) that interposes the dam 202 and the backside of the door. The dam 202 may further define or otherwise provide one or more screw splines 230 (two shown) configured to receive corresponding mechanical fasteners (e.g., screws) to secure an end cap (not shown) to the end of the dam 202.

Figure 3A:
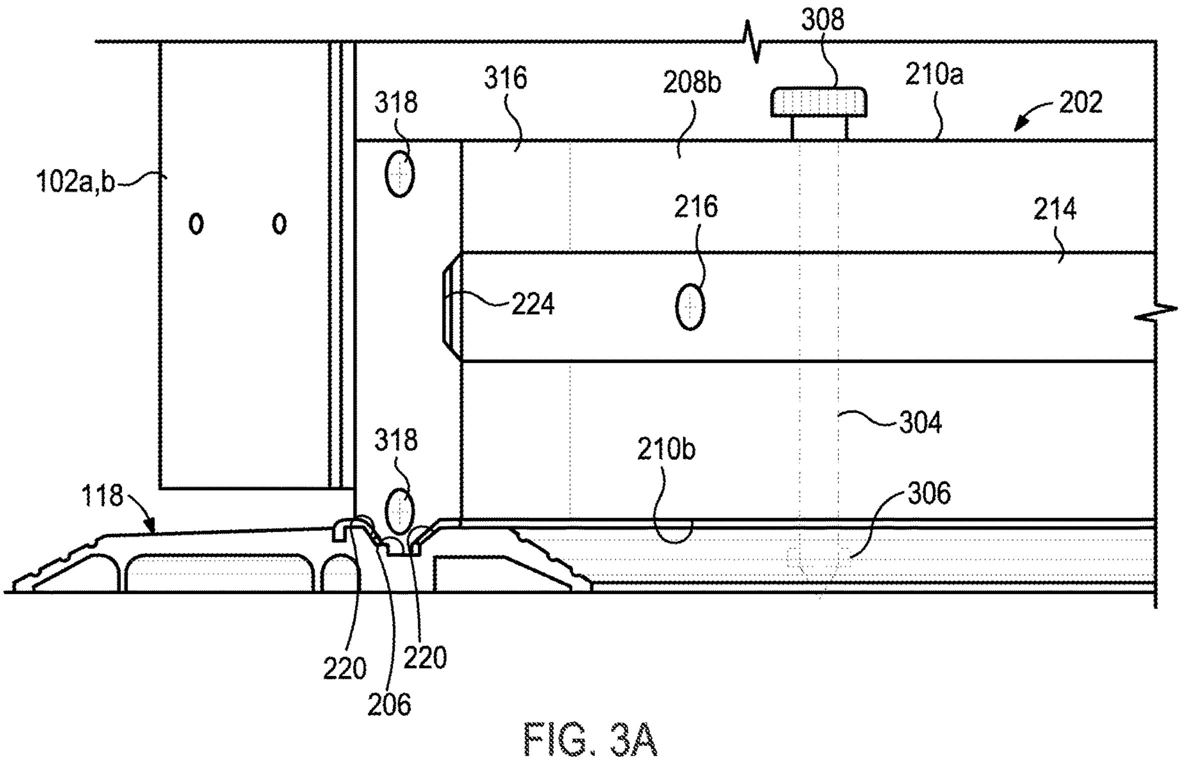
FIGS. 3A and 3B are isometric and end views, respectively, of the dam secured to the threshold, according to one or more embodiments.
Figure 3B:
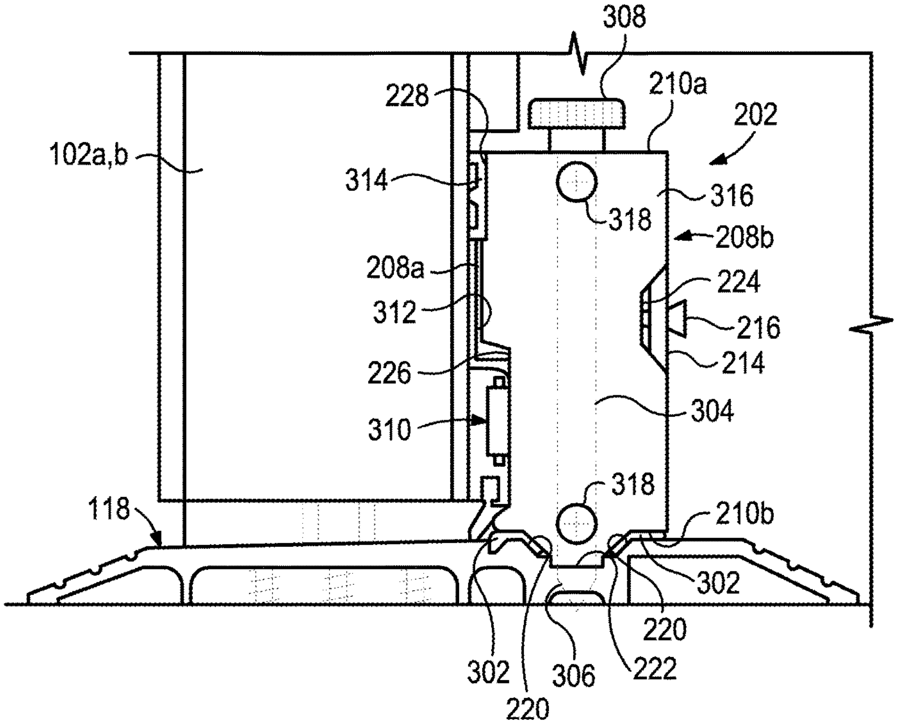

FIGS. 3A and 3B are isometric and end views, respectively, of the removable dam 202 secured to the threshold 118, according to one or more embodiments. As illustrated, the dam 202 is received within the valley 206 after removing the cover 214, and the cover 214 is mounted to and stowed on the back 208*b* of the dam 202 at the cover recess 224. In some embodiments, as mentioned above, the mechanical fastener(s) 216 used to secure the cover 214 to the valley 206 may also be used to secure the cover 214 to the back 208*b* of the dam 202 at the cover recess 224. Alternatively, the cover 214 may be removably secured at the cover recess 224 via a snap-fit engagement or an interference fit, without departing from the scope of the disclosure.

In some embodiments, one or more valley seals 302 (two shown) may interpose portions of the dam 202 (e.g., the bottom 210*b* or the projection 212 of FIGS. 2A-2B) and the valley 206 to generate a sealed interface at the valley 206. More specifically, the valley seals 302 may be arranged to at least partially engage the angled surfaces 220 of the valley 206. The valley seals 302 may extend along the entire length of the threshold 118. The valley seals 302 may comprise any suitable type of elastomeric or foam seal capable of substantially preventing the migration of liquids and/or air through the valley 206. In at least one embodiment, the valley seals 302 may comprise compression seals. In some embodiments, the valley seals 302 may be attached to the bottom 210*b* (FIG. 2A) of the dam 202, but could alternatively be secured to the valley 206 (e.g., at the angled surfaces 220) or comprise independent structures arranged in place upon installing the dam 202 on the threshold 118.

In some embodiments, one or more mechanical fasteners 304 (shown in dashed lines) may be used to secure the dam 202 to the threshold 118. More specifically, the mechanical fastener(s) 304 may be extended vertically through the centerline of the dam 202, from the top 210*a* of the dam 202 to the bottom 210*b*, and extend through (out) the bottom 210*b* to be threaded into corresponding threaded apertures 306 defined in the threshold 118. In at least one embodiment, the apertures 306 may be defined at the trough 222 (FIG. 3B) or bottom of the valley 206. In some embodiments, securing the dam 202 to the threshold 118 using the mechanical fastener(s) 304 may help compress the valley seals 302 interposing the dam 202 and the valley 206, and thereby enhance the sealed interface at the valley 206.

In some embodiments, the mechanical fastener(s) 304 may provide a manually actuatable head 308 that allows a user to manually advance and secure the mechanical fastener(s) 304 at the corresponding aligned aperture(s) 306. In the illustrated embodiment, for example, the head 308 comprises a knob or a thumb turn anchor that can be hand-operated and otherwise manually manipulated by a user to rotate and secure the mechanical fastener(s) 304. In other embodiments however, the head 308 may be configured with a conventional screwdriver interface, such as a common crosshead or flat (straight) engagement interface, or a six-lobe fastener head drive. In yet other embodiments, one or more of the mechanical fastener(s) 304 may comprise a cap head screw and the head 308 may comprise a conventional type of cap head, without departing from the scope of the disclosure.

The mechanical fastener(s) 216 used to attach the cover 214 to the threshold 118 or the back 208*b* of the dam 202 may be different from the mechanical fastener(s) 304 used to secure the dam 202 to the threshold 118. The mechanical fasteners 216, 304 may differ in length and/or size, for example. Moreover, the mechanical fasteners 216, 304 may be configured to mate with different apertures within the valley 206; e.g., the mechanical fastener(s) 216 are configured to mate with the apertures 218 (FIGS. 2A-2B), while the mechanical fastener(s) 304 are configured to mate with the apertures 306. This may prevent a user from using the wrong mechanical fasteners 216, 304 to secure the dam 202 or the cover 214.

As best seen in FIG. 3B, a door sweep assembly 310 may be secured to a backside 312 of the door 102*a,b*. When the removable dam 202 is mounted to the threshold 118, the door sweep assembly 310 may be aligned with and received within the sweep recess 226 defined by the dam 202 when the doors 102*a,b* are closed.

Still referring to FIG. 3B, in some embodiments, one or more face seals 314 (one shown) may be positioned between the front 208*a* of the dam 202 and the backside 312 of the door 102*a,b* to create a sealed interface when the doors 102*a,b* are closed. The face seal 314 may extend along the entire length of the dam 202, thus providing a sealed interface along the entire backside 312 of the doors 102*a,b*. Similar to the valley seals 302, the face seals 314 may comprise any suitable type of elastomeric or foam seal capable of reducing or preventing the migration of liquids or air past the interface. In at least one embodiment, the face seal 314 may be attached to the front 208*a* of the dam 202 at the seal recess 228, but could alternatively be attached to the backside 312 of the door 102*a,b* or comprise an independent structure arranged in place upon installing the dam 202 on the threshold 118.

In some embodiments, as illustrated, the dam 202 may further include an end cap 316 that may be coupled to one or both ends of the dam 202. The end cap 316 may be made of a variety of rigid materials including, but not limited to, aluminum, rolled sheet metal, a polymer, a composite material (e.g., fiberglass, carbon fiber, etc.), or any combination thereof. In one or more embodiments, the end cap 316 may be injection molded. The end cap 316 may be coupled to the end of the dam 202 using one or more mechanical fasteners 318 (two shown) configured to align with the screw splines 230 (FIG. 2B). As illustrated, the end cap 316 may exhibit substantially the same profile as the dam 202. Consequently, the end cap 316 may include similar structural features that align with the cover recess 224, the sweep recess 226, and the seal recess 228 to accommodate the cover 214, the door sweep assembly 310, and the face seal(s) 314, respectively.

In example operation, when the dam 202 is properly installed on the threshold 118, as generally described above, the valley seals 302 may generate a sealed interface at the valley 206 that reduces or prevents water and air from migrating across (through) the valley 206 and otherwise under the dam 202 and into the interior of the building. Tightly securing the mechanical fasteners 304 to the threshold 118 may compress the valley seals 302 and thereby enhance the sealing effect at the valley 206. Moreover, upon closing the doors 102*a,b*, the face seal(s) 314 may be forced against the backside 312 of the door 102*a,b* and thereby create another sealed interface that helps reduce or prevent water and air from migrating into the interior of the building over the dam 202.

Figure 3C:
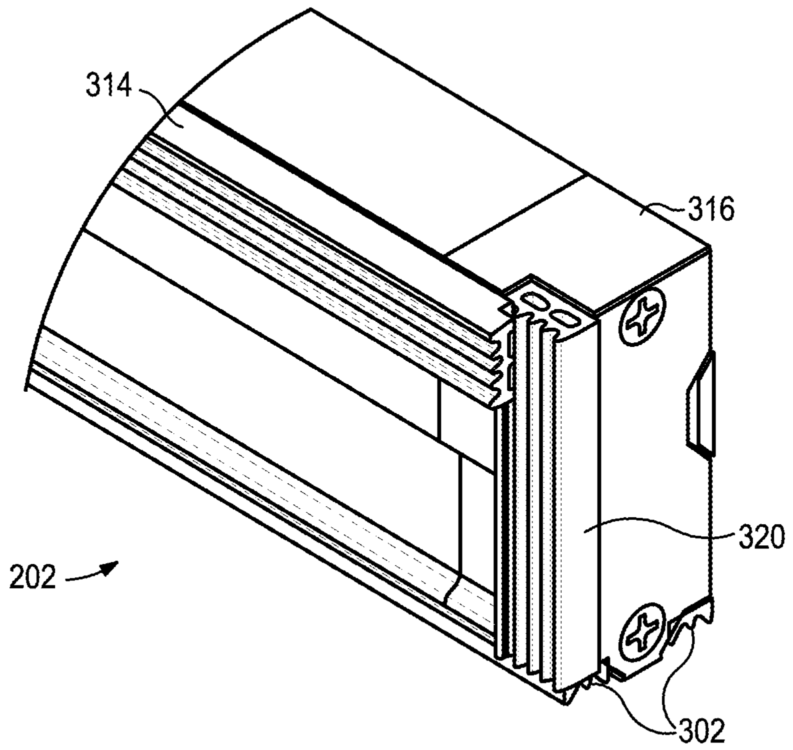
FIG. 3C is an isometric end view of the dam 202 and the end cap 316, according to one or more embodiments.

FIG. 3C is an isometric end view of the dam 202 and the end cap 316, according to one or more embodiments. In at least one embodiment, a vertical seal strip 320 may be attached to the door side of the end cap 316 and may interface with the face seal(s) 314 to create a sealed interface. When the dam 202 is installed, the face seal(s) 314 and the vertical seal strip 320 may create a compression seal against the back surface of the adjacent jambs. Moreover, the combination of the valley seals 302, the face seal(s) 314, and the vertical seal strip 320 may create a substantially sealed interface at the backside of a door that substantially prevents the migration of fluids (air, water, etc.) across the door threshold and into the interior of a building.

Figure 4A:
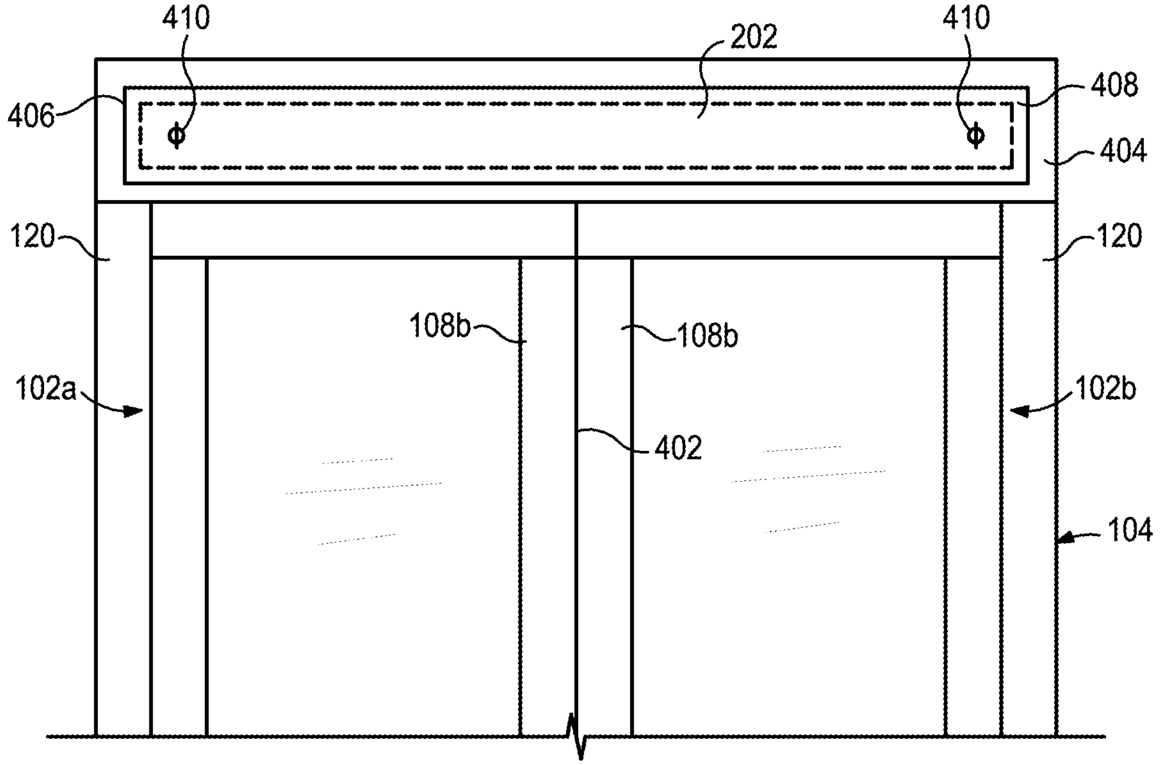
FIG. 4A is an interior view of the system of FIG. 1, according to one or more embodiments.

FIG. 4A is a back (interior) view of the system 100, according to one or more embodiments. As illustrated, the doors 102*a,b* are mounted to the doorframe 104 and are in the closed position, with the center stiles 108*b* meeting at the center and defining an elongated clearance gap 402 between the adjacent facing vertical edges (ends) of the center stiles 108*b*.

In the illustrated embodiment, the doorframe 104 includes a header 404 that extends between or above the opposing vertical jambs 120. In some embodiments, the header 404 may provide or otherwise define an elongate storage compartment 406. The storage compartment 406 may be defined in the header 404 on the exterior or the interior of the doorframe 104. In some embodiments, the dam 202 may be stored in the storage compartment 406 when not in use. Accordingly, the storage compartment 406 may be at least as long as the dam 202 and have a depth sufficient to receive the dam 202.

In some embodiments, the storage compartment 406 may include a cover 408 that occludes the storage compartment 406 when installed and exposes the storage compartment 406 when removed. In at least one embodiment, the cover 408 may include one or more fasteners 410 that can be manually manipulated to secure the cover 408 to the header 404 or release the cover 408. When it is desired to install the dam 202, a user may remove the cover 408, remove the dam 202 from the storage compartment 406, and install the dam 202 as generally described above. The cover 408 may then be replaced to cover the storage compartment 406. Once the dam 202 is no longer needed, the dam 202 may be placed once again in the storage compartment 406 for storage.

Figure 4B:
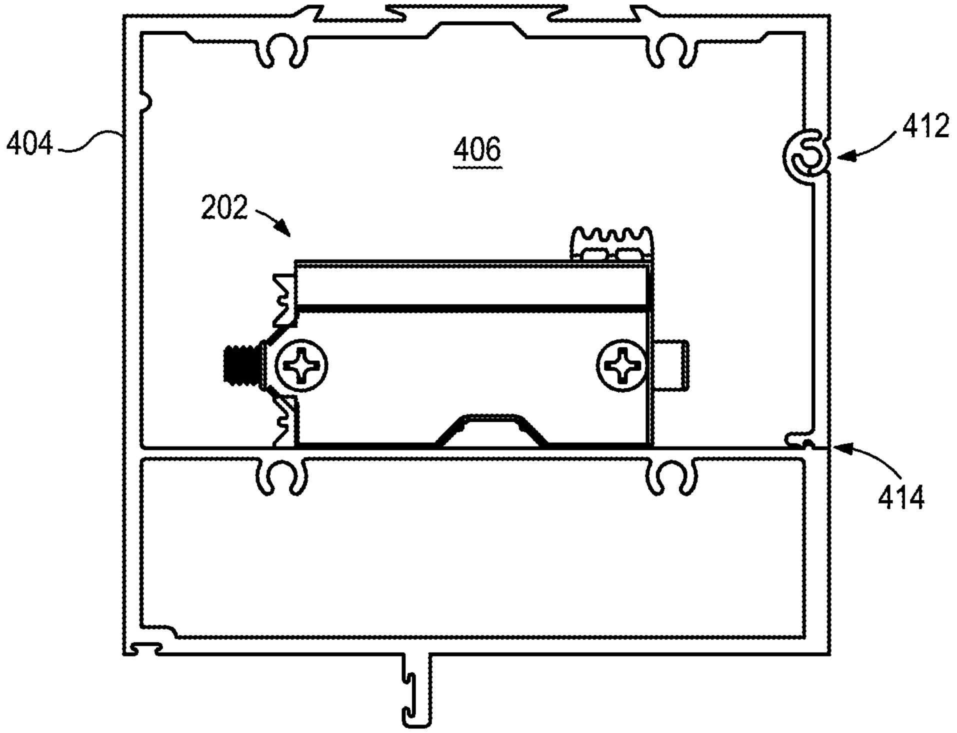
FIGS. 4B and 4C are schematic side views of the header and the storage compartment of FIG. 4A, according to one or more embodiments.
Figure 4C:
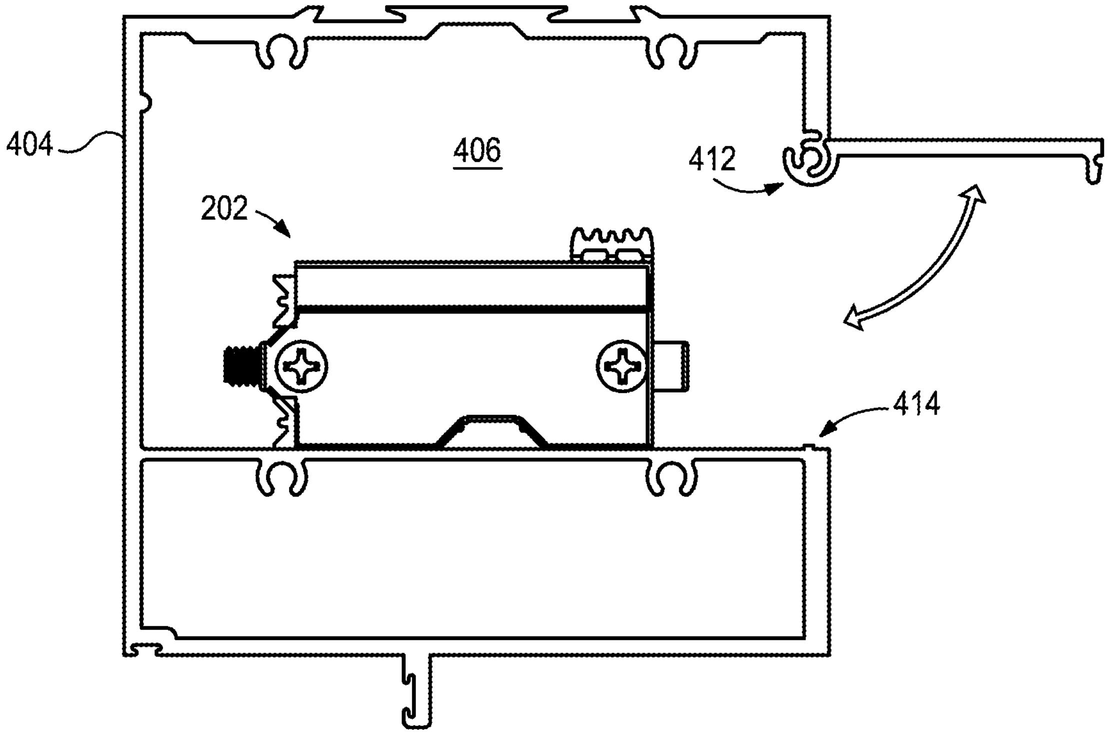

FIGS. 4B and 4C are schematic side views of the header 404 and the storage compartment 406, according to one or more embodiments. As illustrated, the dam 202 is able to be accommodated within the storage compartment 406. Moreover, in the illustrated example, the cover 408 is pivotably attached to the header 404 at one or more hinges 412 (one shown). Those skilled in the art will readily appreciate that the hinge 412 shown in FIGS. 4B-4C is but one example hinge that may be employed in the present embodiment, but other types of hinges may alternatively by used, without departing from the scope of the disclosure. In FIG. 4B, the hinged cover 408 is in a closed configuration, and in FIG. 4C, the hinged cover 408 is in an open configuration. To access the dam 202, a user may pivot the cover to the open configuration. In some embodiments, the cover 408 may be secured to the header 404 in the closed configuration at a releasable coupling 414.

Figure 5:
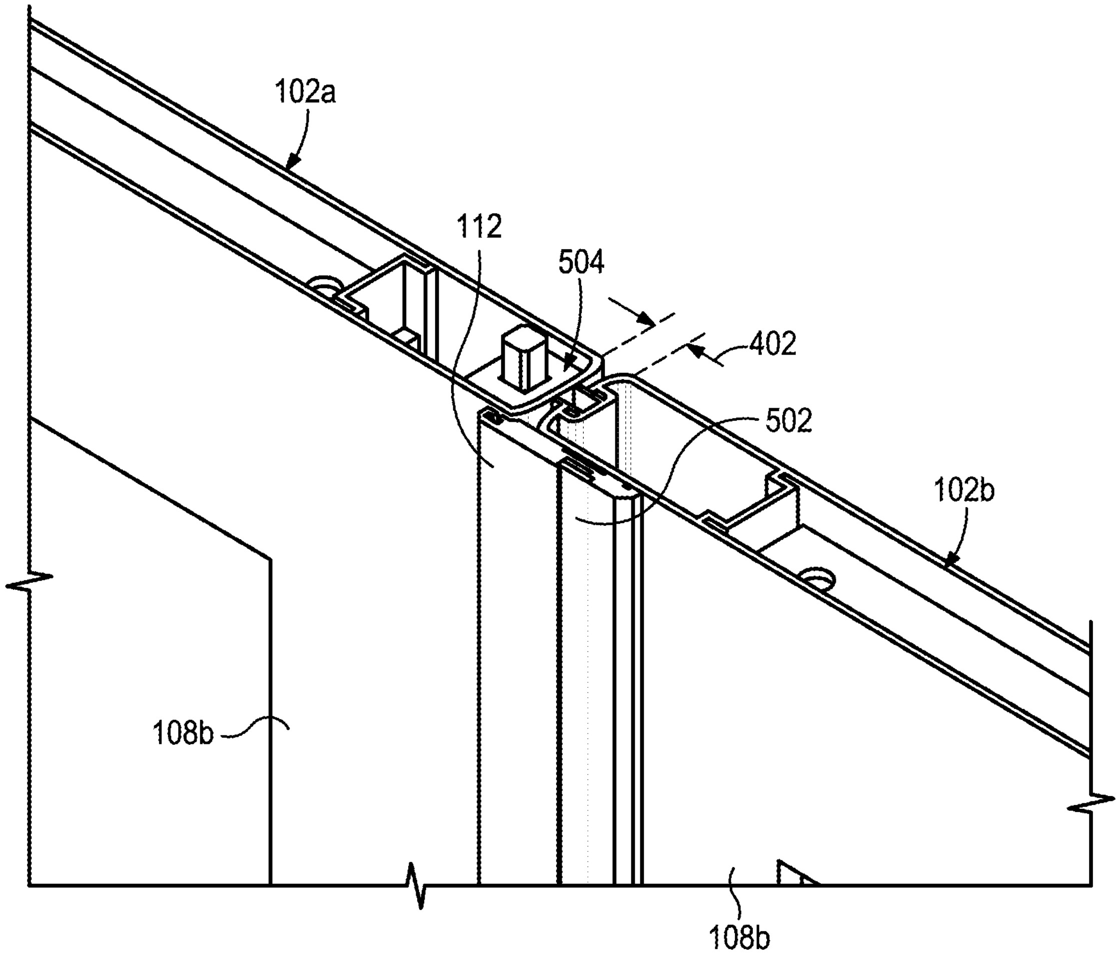
FIG. 5 is an isometric top view of the doors of FIGS. 1 and 4, according to one or more embodiments.

FIG. 5 is an isometric top view of the doors 102*a,b* of FIGS. 1 and 4, according to one or more embodiments. The doorframe 104 (FIGS. 1 and 4) is omitted in FIG. 5 to allow a view of various features of the doors 102*a,b*. As illustrated, the doors 102*a,b* are closed and the center stiles 108*b* meet at the center to define the elongated clearance gap 402 at the adjacent facing vertical edges (ends). As mentioned above, in at least one embodiment, the applied cover 112 may be removably (or permanently) attached to one (or both) of the center stiles 108*b* and configured to extend across and occlude the clearance gap 402. In use, the applied cover 112 may help reduce or prevent the ingress of water and air into the clearance gap 402 and, thus, into the interior of the building. In the illustrated embodiment, the applied cover 112 is coupled to the second door 102*b* on the exterior. In other embodiments, however, the applied cover 112 may alternatively be coupled to either door 102*a,b* on the interior, without departing from the scope of the disclosure. In some embodiments, a cosmetic cover strip 502 may be included with the applied cover 112 to cover mechanical fasteners used to secure the applied cover 112 to the door(s) 102*a,b*.

In some embodiments, a seal assembly 504 may be included in the clearance gap 402 to further help reduce or prevent the migration of water and air between the doors 102*a,b* at the clearance gap 402. As discussed in more detail below, the seal assembly 504 can include one or more side seals and a center seal that cooperatively operate to reduce or prevent fluid (water, air, etc.) migration.

Figure 6:
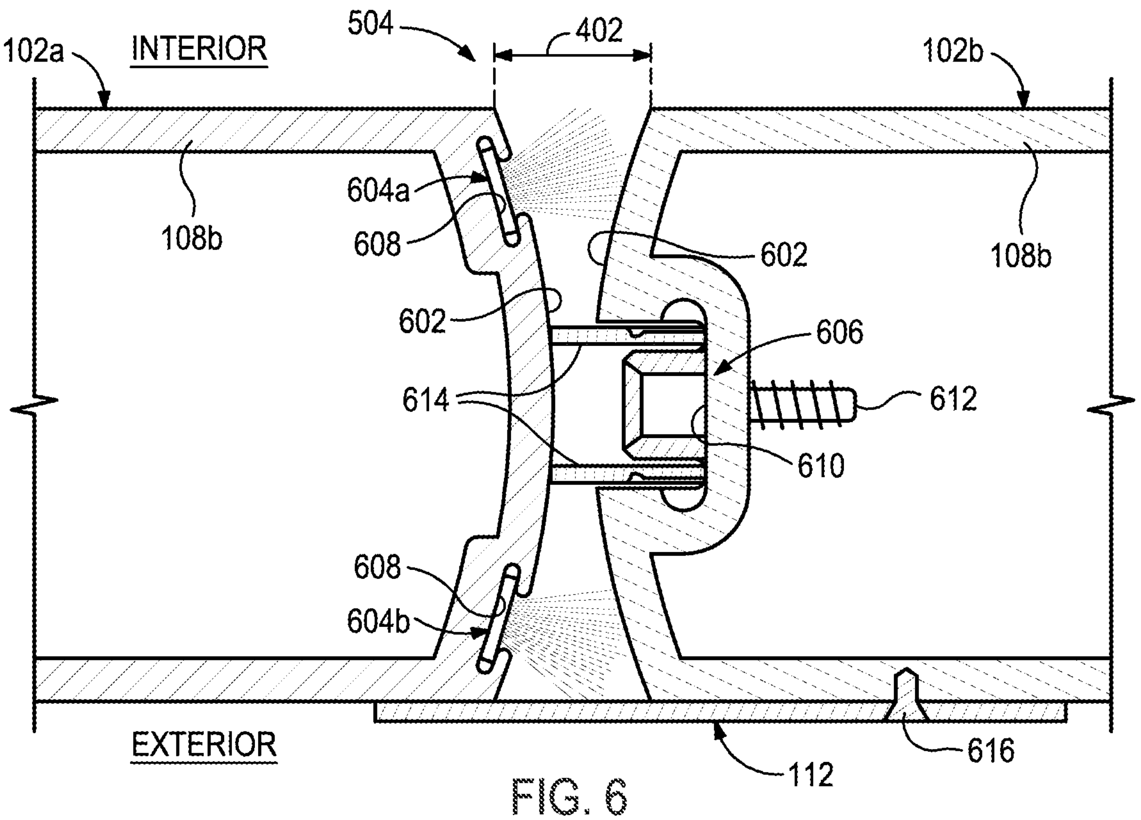
FIG. 6 is an example of the seal assembly of FIG. 5, according to one or more embodiments.

FIG. 6 is an example of the seal assembly 504 of FIG. 5, according to one or more embodiments. As illustrated, the seal assembly 504 is generally arranged within the clearance gap 402 formed when the doors 102*a,b* are closed between adjacent facing vertical edges (ends) 602 of the center stiles 108*b*. In some embodiments, one or both of the vertical edges 602 may be arcuate, curved, or otherwise convex. In other embodiments, however, one or both of the vertical edges 602 may be flat or concave, without departing from the scope of the disclosure.

In the illustrated embodiment, the seal assembly 504 includes first and second side seals 604*a* and 604*b* and a center seal 606 that interposes the side seals 604*a,b*. The side seals 604*a,b* and the center seal 606 may extend vertically along the entire height of the stiles 108*b* and operate to block water and air from migrating through the clearance gap 402 when the doors 102*a,b* are closed.

In the illustrated embodiment, each side seal 604*a,b* may be attached to the first door 102*a* and extend laterally through the clearance gap 402 to engage the center stile 108*b* of the second door 102*b* when the doors 102*a,b* are closed. In some embodiments, the side seals 604*a,b* may comprise lengths of pile weather stripping received within corresponding reglets 608 defined in the vertical edge 602 of the first door 102*a*. In such embodiments, the side seals 604*a,b* may comprise brush seals, but could alternatively comprise silicone or elastomer seals. In other embodiments, the reglets 608 may be omitted and the side seals 604*a,b* may instead be coupled directly to the outer surface of the vertical edge 602 of the first door 102*a*, without departing from the scope of the disclosure.

The side seals 604*a,b* may be mounted within the reglets 608 at or near the inner and outer faces (peripheries) of the first door 102*a*. More specifically, the first side seal 604*a* may be arranged at or near the inner face (i.e., facing the interior of the building) of the first door 102*a*, and the second side seal 604*b* may be arranged at or near the outer face (i.e., facing the exterior of the building) of the first door 102*a*. Moreover, because of the arcuate or convex geometry of the vertical edges 602 of the center stiles 108*b*, one or both of the side seals 604*a,b* may be angled outward relative to the inner or outer faces of the first door 102*a* and otherwise extend partially outside the clearance gap 402. In other embodiments, however, the reglets 608 may be configured such that one or both of the side seals 604*a,b* extends substantially parallel to the inner or outer surface of the first door 102*a*, without departing from the scope of the disclosure.

In the illustrated embodiment, the center seal 606 is mounted to the vertical edge 602 of the second door 102*b* and extends laterally through the clearance gap 402 to engage the center stile 108*b* of the first door 102*a* when the doors 102*a,b* are closed. In some embodiments, the center seal 606 may be received within a reglet 610 defined in the vertical edge 602 of the second door 102*b*, but may alternatively be mounted to the outer surface of the vertical edge 602, without departing from the scope of the disclosure. The center seal 606 may be affixed to the center stile 108*b* of the second door 102*b* using one or more mechanical fasteners 612. In some embodiments, the mechanical fastener(s) 612 may be adjustable to counteract active door leaks through the clearance gap 402.

In some embodiments, the center seal 606 may comprise a spring-loaded, applied astragal. In such embodiments, as illustrated, the center seal 606 may include one or more flanges 614 (two shown) that extend laterally to engage the center stile 108*b* of the first door 102*a* when the doors 102*a,b* are closed. The flanges 614 may be made of an elastomer, but may alternatively be made of silicone or a polymer. Moreover, in some embodiments, the fastener 612 may be spring-loaded such that when the fastener 612 is fully seated, the spring is compressed and the center seal 606 is at is shortest setting. Upon loosening the fastener 612, the spring may push the center seal 606 out and closer to the opposing vertical edge 602 of the opposing door 102*b*.

FIG. 6 also depicts an example of the applied cover 112. In the illustrated example, the applied cover 112 is removably attached to the center stile 108*b* of the second door 102*b* using one or more mechanical fasteners 616. The applied cover 112 extends across and occludes the clearance gap 402 on the exterior side of the doors 102*a,b*, and thus may help reduce or prevent the ingress of water and air into the clearance gap 402. When the threat of water or air ingress is abated, the applied cover 112 may be removed from the second door 102*b*.

Figure 7:
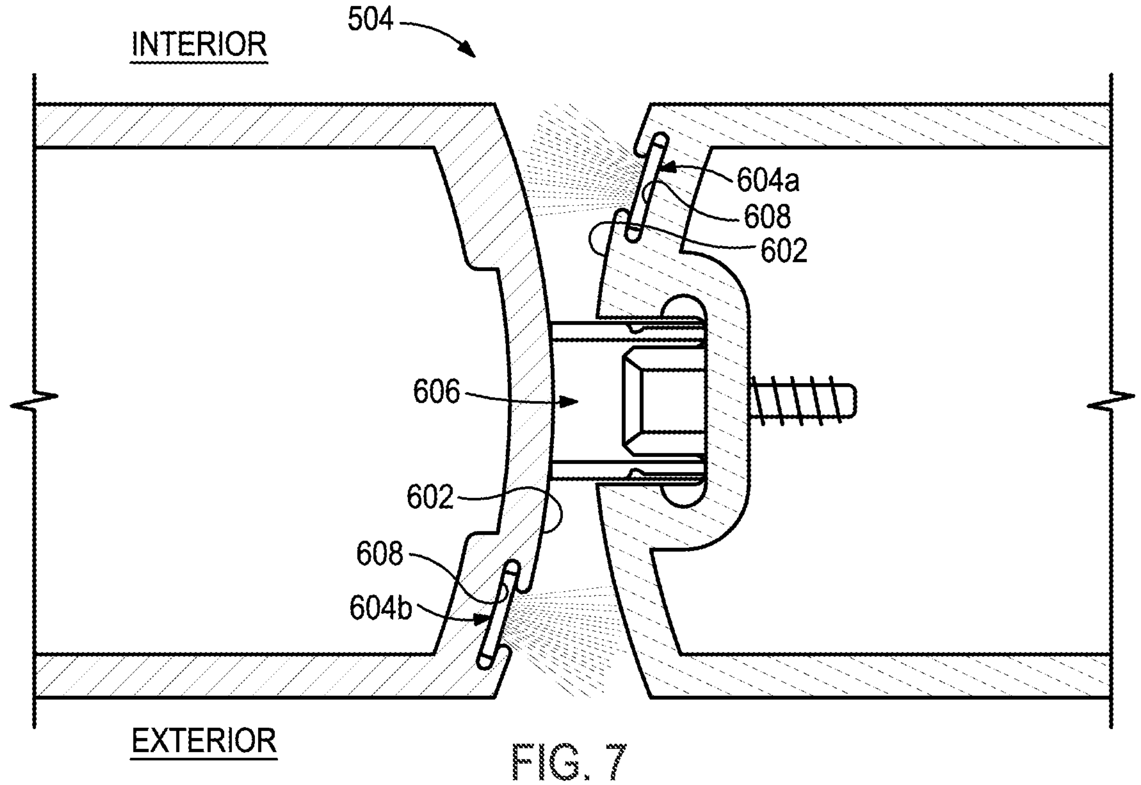
FIG. 7 is another example of the seal assembly of FIG. 5, according to one or more additional embodiments.

FIG. 7 is another example of the seal assembly 504 of FIG. 5, according to one or more additional embodiments. Similar to the embodiment of FIG. 6, the seal assembly 504 of FIG. 7 includes the first and second side seals 604*a,b* and the center seal 606 interposing the side seals 604*a,b* within the clearance gap 402. Unlike the embodiment of FIG. 6, however, the side seals 604*a,b* in the seal assembly 504 of FIG. 7 are attached to the vertical edge 602 of opposing doors 102*a,b* and extend laterally to engage the center stile 108*b* of the opposite door 102*a,b* when the doors 102*a,b* are closed. More specifically, the first side seal 604*a* may be coupled to the center stile 108*b* of the second door 102*b* and extend to engage the center stile 108*b* of the first door 102*a*, and the second side seal 604*b* may be coupled to the center stile 108*b* of the first door 102*a* and extend to engage the center stile 108*b* of the second door 102*b*. In some embodiments, as illustrated, the side seals 604*a,b* may be mounted within corresponding reglets 608, but may alternatively be coupled to the outer surface of the vertical edge 602 of the respective door 102*a,b*, without departing from the scope of the disclosure.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A door system, comprising:

a doorframe having opposing vertical jambs;

a door pivotably coupled to the doorframe;

a threshold extending between the opposing vertical jambs and providing a first upper surface, a second upper surface, first and second valley surfaces extending from the first and second upper surfaces, respectively, such that the first and second valley surfaces slope toward each other, and a trough base extending between the first and second valley surfaces, the first and second valley surfaces defining a valley;

a dam removably mountable to the threshold and providing a projection extending downward from a bottom of the dam and sized to be received within the valley, the projection comprising:

a first dam surface complementary to the first valley surface, wherein a first gap is defined between the first dam surface and the first valley surface;

a second dam surface complementary to the second valley surface; and a dam base extending between the first and second dam surfaces and contacting the trough base; and a valley seal positioned in the first gap when the dam is mounted to the threshold and thereby generating a sealed interface between the dam and the threshold, wherein the threshold further provides third and fourth valley surfaces extending transversely from the first and second valley surfaces, respectively, and first and second trough surfaces extending transversely from the third and fourth valley surfaces, respectively, and transversely from the trough base, the projection further comprises: third and fourth dam surfaces extending transversely from the first and second dam surfaces, respectively, and transversely from the dam base, wherein the third and fourth dam surfaces contact the first and second trough surfaces, respectively.

2. The door system of claim 1, further comprising a cover that occludes the valley and is removable prior to mounting the dam at the valley.

3. The door system of claim 2, wherein the dam defines a cover recess sized to receive and removably secure the cover once removed from the threshold.

4. The door system of claim 1, further comprising:

a door sweep assembly mounted to a backside of the door; and a sweep recess defined on the dam and sized to receive at least a portion of the door sweep assembly when the door is closed.

5. The door system of claim 1, further comprising a face seal interposing a backside of the door and the dam and generating a sealed interface between the door and the dam when the door is closed.

6. The door system of claim 1, further comprising an end cap coupled to one or two ends of the dam.

7. The door system of claim 1, wherein the doorframe includes a header that provides an elongate storage compartment sized to receive and store the dam when not in use.

8. The door system of claim 1, wherein the door comprises a first door and the door system further comprises:

a second door pivotably coupled to the doorframe, wherein an elongated clearance gap is generated between the first and second doors when the first and second doors are closed; and a seal assembly installed in the clearance gap and including first and second side seals coupled to a center stile of the first door, and a center seal coupled to a center stile of the second door and interposing the first and second side seals when the first and second doors are closed.

9. The door system of claim 8, further comprising an applied cover attached to one of the first or second doors and extending across and occluding the clearance gap.

10. A removable dam assembly, comprising:

an elongate dam defining a projection extending downward from a bottom of the dam, wherein the projection comprises a dam base, a first dam surface, and a second dam surface, wherein the first and second dam surfaces are sloped relative to the dam base and extend away from each other;

a threshold extendable between opposing vertical jambs of a doorframe and providing:

a first upper surface;

a second upper surface;

a first valley surface extending from the first upper surface and complementary to the first dam surface;

a second valley surface extending from the second upper surface and complementary to the second dam surface, wherein the first and second valley surfaces extend from the first and second upper surfaces, respectively, such that the first and second valley surfaces slope toward each other and cooperatively define a valley sized to receive the projection; and a trough base extending between the first and second valley surfaces, wherein the dam base contacts the trough base when the threshold receives the elongate dam; and a valley seal attached to the bottom of the dam and interposing the first dam surface and the first valley surface when the dam is mounted to the threshold, whereby the valley seal generates a sealed interface between the dam and the threshold, wherein the threshold further provides third and fourth valley surfaces extending transversely from the first and second valley surfaces, respectively, and first and second trough surfaces extending transversely from the third and fourth valley surfaces, respectively, and transversely from the trough base, the projection further comprises: third and fourth dam surfaces extending transversely from the first and second dam surfaces, respectively, and transversely from the dam base, wherein the third and fourth dam surfaces contact the first and second trough surfaces, respectively, when the threshold receives the elongated dam.

11. The removable dam assembly of claim 10, further comprising a cover that occludes the valley and is removable prior to mounting the dam at the valley.

12. The removable dam assembly of claim 11, wherein the cover is removably coupled to the threshold at the valley using one or more mechanical fasteners.

13. The removable dam assembly of claim 11, wherein the dam defines a cover recess sized to receive and removably secure the cover once removed from the threshold.

14. The removable dam assembly of claim 10, further comprising:

a seal recess defined on a front surface of the dam; and a face seal attached to the front surface of the dam at the seal recess.

15. The removable dam assembly of claim 10, further comprising an end cap coupled to one or two ends of the dam.

16. The removable dam assembly of claim 10, wherein the valley seal is a first valley seal, wherein the sealed interface is a first sealed interface, and wherein the removable dam assembly further comprises a second valley seal attached to the bottom of the dam and interposing the second dam surface and the second valley surface when the dam is mounted to the threshold, whereby the second valley seal generates a second sealed interface between the dam and the threshold.

17. The door system of claim 1, wherein the valley seal is a first valley seal, wherein the sealed interface is a first sealed interface, wherein a second gap is defined between the second dam surface and the second valley surface, and wherein the door system further comprises a second valley seal positioned in the second gap when the dam is mounted to the threshold and thereby generating a second sealed interface between the dam and the threshold.

* * * * *